Figure 1:
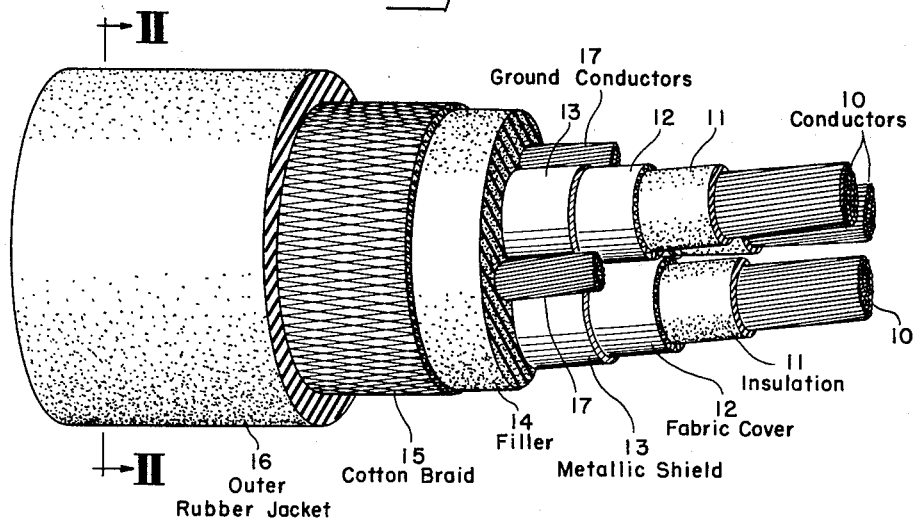

Nov. 3, 1953    J. J. MORRISON    2,658,014
METHOD OF MAKING ELECTRICAL CABLE
Original Filed Feb. 26, 1946

INVENTOR.
JAMES J. MORRISON,
BY Donald G. Dalton
ATTORNEY

Patented Nov. 3, 1953

2,658,014

UNITED STATES PATENT OFFICE 2,658,014

METHOD OF MAKING ELECTRICAL CABLE

James J. Morrison, Worcester, Mass., assignor to United States Steel Corporation, a corporation of New Jersey Original application February 26, 1946, Serial No. 650,348. Divided and this application January 25, 1949, Serial No. 72,574

1 Claim. (Cl. 154—2.24)

This invention relates to improved electrical cables and methods by which they are made and is a division of my copending application, Serial No. 650,348, filed February 26, 1946, now abandoned. The invention has particular reference to portable cables that are subjected to rough handling and are exposed to mechanical shock in service.

Such cables, particularly of the rubber or rubber-like jacketed type, are subjected to extremely rough handling in normal service in mining operations, excavation work in general contracting, rock quarrying, dredging and the like. Shock from falling rock and construction materials, being run over by trucks and movable equipment, and other rough usage is common, and, unless sufficient protection is given by the jacket and fillers of the cable, the insulation on the individual electrical conductors may be damaged, with resulting failure of the cable.

It is common practice to use fillers of fibrous material, such as jute or cotton, to round up the cable core when the conductors are cabled into the required multiple conductor form; preformed rubber or rubber-like fillers may also be used for a like purpose. It is also common practice to fill the interstices between conductors with rubber or rubber-like compound by the extrusion process, the filler being bonded, if desired, with the later applied jacket by a final vulcanizing process. Such fillers, in addition to making the cable round, must also serve as a cushion base for the jacket for final absorption of the shock from blows received in service. Fillers of the fibrous type, as well as those of rubber or rubber-like material, however, often lack sufficient elasticity for such desired cushioning action. The fibrous fillers tend to pack and become hard, as well as being subject to freezing in cold weather from entrained moisture, while rubber or rubber-like fillers are stiff and also increase the weight of the completed cable.

An object of this invention is to provide a cable construction and method of manufacture which will provide an increase in cushioning action by the fillers while retaining the advantages of rubber or rubber-like material in the elimination of water absorption in such fillers. It is also an object of the invention to produce a reduction in weight of the completed cable.

These results are accomplished by this invention by the use of sponge rubber or rubber-like material for such fillers, the fillers of such composition and structure in the completed cable providing a maximum of cushion effect for the absorption of shock and blows on the cable jacket with definite protection to the insulated conductors forming the cable core.

Figure 2:
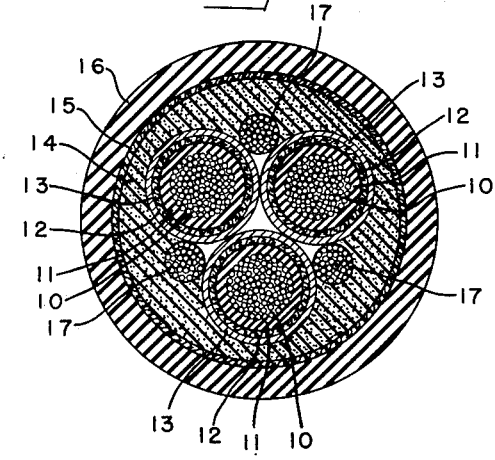

In the accompanying drawings:

Figure 1 is an elevation of the cable made in accordance with a preferred embodiment of this invention, portions of the cable being broken away to reveal the interior structure of the cable; and Figure 2 is a cross sectional view of the same cable, the section being taken along line II—II of Figure 1.

Referring particularly to the accompanying drawings, the numeral 10 indicates conductors which preferably are composed of stranded copper wires. The conductors 10 are provided with a layer of insulation 11 and are positioned adjacent to each other. The insulation 11 may be of rubber, rubber-like material, synthetic resin, varnished cambric, paper, fabric, or other suitable material as desired. Over the insulation 11 is provided a fibrous or fabric cover 12 so that the conductors 10 are furnished with additional protection and means of identification as by color of cover 12 or other suitable means. A further protection for the conductors may consist of a metallic shielding 13, in the form of a braid, tape, or wire wound thereabout, to reduce static stresses and provide a safe and continuous ground connection.

The individually insulated conductors, so constructed, are laid up together, as in the three conductor form of cable shown in the drawings. If required for additional ground capacity, grounded conductors 17 may be placed in the interstices formed by the cabled individually insulated conductors. Over the assembled conductors is placed a protective jacket composed of the inner jacket and filler 14 and a dense, tough, outer jacket 16, such outer jacket being composed of rubber or rubber-like material. Between the outer jacket 16 and the inner jacket 14 may be placed a reinforcing wind or braid of cotton cord 15. The inner jacket 14 is likewise composed of rubber or rubber-like material, but in such material there is included a substantial quantity of a "blowing agent" which will form gas during vulcanization, thus producing a sponge-like condition in the filler and inner jacket. The cable, after the application of the outer jacket 16, is then vulcanized, usually in a common type of mold or lead pipe, such operation vulcanizing both the inner jacket and filler 14 and the outer jacket 16, and bonding them together. With the construction described, the resultant jacket on the cable will be composed of an outer wear resistant section of a dense tough character and with an inner section and filler section of substantial thickness composed of spongy rubber or rubber-like material well adapted to absorb shock and external blows for the protection of the insulated conductor forming the core and, likewise, resulting in a lighter weight cable than with the use of regular dense inner jacket and fillers. By the use of a crepe type of tape covering over the assembled core before application of the filler and jacket as outlined in United States Patent No. 2,286,827, the sponge effect will be increased due to the increased expansion volume available for the sponge condition of jacket and filler 14 to form in the interstitial spaces between the conductors and with consequent improvement in shock absorbing qualities and lessened weight of the resulting cable.

The rubber or rubber-like material, generically termed an elastomer, of which inner jacket and filler 14 is made may be composed of a natural rubber alone, or of a tire stock, such as the so-called 60% tire stock, containing natural rubber and carbon black. It is also possible to use for such jacket and filler 14 any of the so-called synthetic rubbers which are vulcanizable, such as polymers of chloroprene, sold under the trade names Neoprene, Sovprene, and GR-M, copolymers of butadiene and styrene, sold under the trade names Buna S, Chemigum IV, Hycar OS, and GR-S, polymers of butadiene, sold under the trade names Buna 85, Buna 115, SKA, and SKB, copolymers of butadiene and acrylonitrile, sold under the trade names Perbunan, Buna N, Perbunan Extra, Chemigum III, Hycar OR, and Thiokol RD, and copolymers of isobutylene and butadiene or isoprene, sold under the trade names Butyl or GR-I. It is to be understood that the above list is not exhaustive, and that various other vulcanizable elastomers, natural or synthetic, may be employed.

The "blowing agent" to be employed is thoroughly dispersed throughout the material of which jacket and filler 14 is to be formed before it is molded about the conductors. Such agent may be sodium bicarbonate, ammonium carbonate, or other similar materials or mixtures of materials well-known as sponging or blowing agents in the rubber working art.

An amount of blowing agent is used which is sufficient to cause the material forming inner jacket and filler 14 to expand in volume in amounts from 25 to 100% when such material is vulcanized in place in the cable. In one preferred embodiment such amount of expansion of volume after vulcanization is 40%. Such expansion of the inner jacket and filler is a direct measure of the volume of the voids in the sponge material as it occurs in the finished cable. Such volume of the voids thus may range from 25 to 100% of the volume of the elastomer per se in the sponge material. Such expansion is taken care of by a flow of the material 14 into the spaces between the insulated conductors 10 and between such conductors and grounded conductors 17, if such are employed, and by an expansion of the outer jacket 16, to some extent, due to the outwardly directed pressure exerted by the expanded, vulcanized, inner jacket and filler 14.

As a specific example of a composition suitable for use in the making of jacket and filler 14 there is given the following, which is illustrative only, all parts being given by weight:

| | Parts |
|---|---|
| GR-S | 100 |
| Factice | 200 |
| ZnO | 40 |
| Litharge | 8 |
| Sulphur | 2 |
| Accelerator | 2 |
| Sodium bicarbonate | 80 |
| Stearic acid | 40 |
| Processing oil | 12 |

The above composition is mixed in accordance with conventional rubber practice, as for example, in a Banbury mixer, and is then applied in a conventional manner to the assembly of conductors and grounded cables, as by the extrusion process. It will be understood that various ingredients in the above composition may be replaced by other known equivalents. For instance, in place of stearic acid any fatty acid may be employed. The processing oil may be a mineral oil such as paraffin oil or the well-known oil for such purpose, marketed under the trade name "Circo Oil." Factice, which is an ingredient of the above composition, is a vulcanized vegetable oil customarily employed as a softener and filler for rubber and rubber-like materials.

The outer jacket 16 of the electrical cable may be made of natural rubber, natural rubber with a filler such as carbon black, or any one of the vulcanizable elastomers set out as useful in making the inner jacket and filler 14, the choice of such elastomer depending upon the particular properties desired in the finished outer jacket. The outer jacket may likewise be applied to the cable cover and intimate contact with the inner jacket and filler by an extrusion process.

In the accompanying drawings, a construction indicating three conductors is shown, and the cable has a jacket as sole outer protection, but the features of the invention will apply to any cable of one or more conductors, and additional outer protective coverings may be applied if desired.

While I have shown and described a specific embodiment of this invention, it must be understood that I do not wish to be limited exactly thereto since various modifications may be made without departing from the scope of the invention as outlined by the appended claim.

I claim:

In the manufacture of cables for the transmission of electric current, the method which comprises assembling a plurality of insulated conductors so as to have valleys between them, extruding an inner jacket and filler of a vulcanizable elastomer completely around and into contact with the assembled conductors, such elastomer containing a sufficient quantity of a blowing agent to cause the elastomer to expand in volume from 25 to 100% when vulcanized in place around the cable, extruding an outer jacket forming body around the inner jacket and filler, the outer jacket forming body being composed of a vulcanizable elastomer of such composition that when vulcanized it forms a dense, tough material, said outer jacket having an inner diameter greater than the outer diameter of said assembled conductors, and then subjecting the cable to heat to cause the first named elastomer to expand inwardly into said valleys and outwardly against said outer jacket to expand the same and to vulcanize the inner jacket, filler and outer jacket and to bond them directly together throughout the inner periphery of the outer jacket.

JAMES J. MORRISON.

References Cited in the file of this patent

UNITED STATES PATENTS

| Number | Name | Date |
|---|---|---|
| 2,149,002 | Wermine | Feb. 28, 1939 |
| 2,186,793 | Wodtke | Jan. 9, 1940 |
| 2,518,454 | Elliott | Aug. 15, 1950 |